No. 662,992. Patented Dec. 4, 1900.
H. M. WARREN.
ELECTRIC CURRENT INDICATOR.
(Application filed Dec. 9, 1899.)
(No Model.)
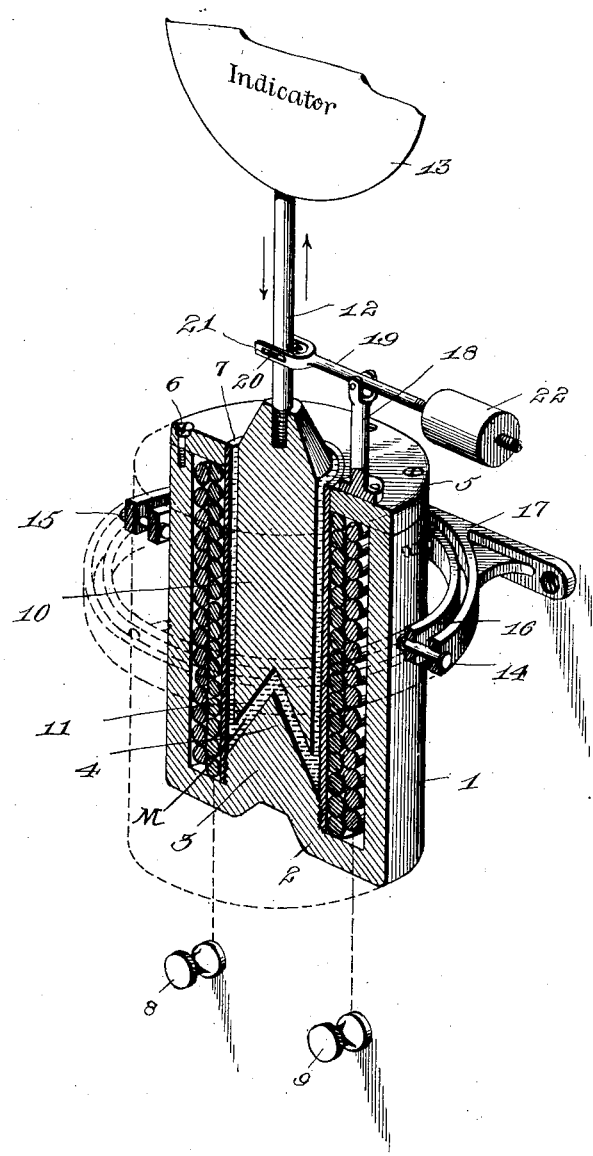
Witnesses
Inventor
Harry M. Warren,
by
Attorneys

UNITED STATES PATENT OFFICE.

HARRY MUNSON WARREN, OF SCHENECTADY, NEW YORK.

ELECTRIC-CURRENT INDICATOR.

SPECIFICATION forming part of Letters Patent No. 662,992, dated December 4, 1900.

Application filed December 9, 1899. Serial No. 739,339. (No model.)

*To all whom it may concern:*

Be it known that I, HARRY MUNSON WARREN, a citizen of the United States, residing at Schenectady, in the county of Schenectady, in the State of New York, have invented a new and useful Electric-Current Indicator, of which the following is a specification.

My invention relates to devices for indicating the strength of an electric current by means of an indicator operated by the movement of a core or plug in a solenoid energized by the current itself, one object being to simplify and generally improve the construction and operation of such indicating devices, with the special purpose of adapting them for use on electric cars or elsewhere where electric motors are used to indicate the number of times definite currents are sent through the instruments—for instance, on electric cars to indicate or record the number of times the motors take, say, one hundred, two hundred, and three hundred amperes.

A secondary object is to provide a device of this class which may be used as an ordinary ammeter.

With these objects in view my invention consists in the improved construction, arrangement, and combination of parts hereinafter fully described and afterward specifically pointed out in the claims.

In the drawing forming part of this specification I have illustrated the invention in a perspective vertical sectional view, some of the cut-away portions being shown in dotted lines.

Referring to the drawing by numerals, 1 indicates a cylinder with open top and closed bottom, the bottom 2 being provided with a central vertical projection 3, finished at its upper end in form of a cone, as at 4. The top of the cylinder is partially covered by a ring 5, secured by screws 6, and a tube 7 fits inside this ring and on the outside of the projection 3. Between the cylinder and this ring 5 are the coils forming the solenoid, the opposite ends of which are electrically connected by binding-posts 8 9 with the current-wire. Within the tube 7 is a body of mercury M, and in the mercury is loosely suspended an iron core 10, hollowed in its lower end at 11 to correspond in shape with the conical end 4 of projection 3, over which it hangs. In the upper end of the core is threaded a rod 12, which may be attached to an ordinary indicator 13, which may be provided with the usual means for indicating the movements of the rod 12. As the particular construction of the indicator forms no part of my invention and may be of any desired form, I have not shown it in the drawing.

The cylinder 3 is mounted on screws 14 15, engaged in rings 16, forming part of a bracket 17, securable to the wall or other support.

An upright 18 is mounted on top of cylinder 3, having a forked upper end, in which is pivoted a lever 19, connected to rod 12 by trunnions 20 in the rod engaging in slots 21 in the lever, the lever being provided with a weight 22 to partially counterbalance the weight of the core 10. The current passing through the solenoid will exert a pull downward upon the core, dependent upon the strength of the current, and with the indicator set to indicate a normal strength an increased or decreased degree will be indicated upon the dial as the core is drawn down or let up by the increase or decrease of the current.

It will of course be understood that the indicator-pointer will be provided with means to retract it when the pull decreases, such means in this instance being the body of mercury M in which the core is suspended.

When the instrument is used on a car, the counterbalance-weight will prevent the jarring of the car from operating the indicator.

Having thus fully described my invention, what I claim as new, and desire to secure by Letters Patent, is—

1. In an electric-current indicator, the combination with an indicator mechanism of a cylindrical shell having closed bottom and central conical projection thereon, of a solenoid or helix, a tube within the helix, and the conical projection, and counterbalanced core inside said tube having conical hollow in its bottom and connected with the indicating mechanism, substantially as described.

2. In an electric-current indicator, the combination with a solenoid, a core therein, the top of which is conical, counterbalancing devices connected to the core, and a pointer-operating rod connected to the core, substantially as described.

3. In an electric-current indicator, a bracket securable to a wall or other support and provided with a horizontal ring, a cylinder secured in said ring, a solenoid in the cylinder, a core in the solenoid, a counterbalancing-lever pivoted to the cylinder and connected to the core and an operating-rod connected to the core, substantially as described.

4. The herein-described electric-current indicator, comprising the cylinder with closed bottom having central projection with conical top, the ring partially closing the top of the cylinder, the tube inserted in the ring and over the central bottom projection, the helix between the cylinder and tube, the core in the tube having the conical hollow in its bottom and suspended in mercury, the pointer-operating rod secured to the core, and the counterbalancing-lever connected to the rod by a joint permitting true vertical movement of the core and rod, these parts being arranged and combined, substantially as described.

HARRY MUNSON WARREN.

Witnesses:
ERNEST HUTTON,
HANFORD JUDSON.